United States Patent [19]

Nakano

[11] Patent Number: 5,817,346

[45] Date of Patent: Oct. 6, 1998

[54] SHEET WIDTH ADJUSTING APPARATUS FOR ROLLING HEAD EXTRUDER

[75] Inventor: Hiromi Nakano, Takasago, Japan

[73] Assignee: Kabushiki Kaisha Kobe Seiko Sho, Kobe, Japan

[21] Appl. No.: 662,207

[22] Filed: Jun. 12, 1996

[30] Foreign Application Priority Data

Jun. 16, 1995 [JP] Japan .................................. 7-150417

[51] Int. Cl.⁶ ...................................................... B29B 7/56
[52] U.S. Cl. .................... 425/186; 425/190; 425/192 R; 425/194; 425/376.1
[58] Field of Search .................................. 425/186, 188, 425/190, 192 R, 194, 367, 376.1; 411/155, 156, 544, 917

[56] References Cited

U.S. PATENT DOCUMENTS

| | | | |
|---|---|---|---|
| 2,035,497 | 3/1936 | Morse | 411/544 |
| 3,359,597 | 12/1967 | Bainton | 425/367 |
| 3,947,201 | 3/1976 | Ellwood | 425/376.1 |
| 4,304,539 | 12/1981 | Hagiwara et al. | 425/376.1 |
| 4,354,814 | 10/1982 | Grimminger et al. | |
| 4,720,223 | 1/1988 | Neights et al. | 411/11 |
| 4,909,012 | 3/1990 | Thompson, Jr. et al. | 411/343 |
| 5,122,041 | 6/1992 | Baumgarten | 425/188 |
| 5,167,894 | 12/1992 | Baumgarten | 425/194 |

FOREIGN PATENT DOCUMENTS

| | | |
|---|---|---|
| 0 087 041 | 8/1983 | European Pat. Off. . |
| 2229828 | of 1974 | Germany . |
| 33 38 117 | 5/1985 | Germany . |
| 35 08 547 | 9/1986 | Germany . |
| 36 37 358 | 3/1988 | Germany . |
| 316223 U | of 1991 | Japan . |
| 998725 | of 1965 | United Kingdom . |

*Primary Examiner*—Patrick Ryan
*Assistant Examiner*—Iurie A. Schwartz
*Attorney, Agent, or Firm*—Oblon, Spivak, McClelland, Maier & Neustadt, P.C.

[57] ABSTRACT

To prevent an extruding material from moving in and between an extruder body and a contact surface of side guides and to provide automation of adjustment of a sheet width. A roller head extruder in which a pair of calendar rolls 8 are disposed forwardly of a material extruding opening 4 of an extruder body 1, a pair of left and right side guides 9 are disposed so that a material extruded from said extruding opening 4 is molded into a sheet form by the calendar rolls 8, wherein said side guides 9 can be automatically moved in a direction of the sheet width by a moving cylinder 19 and secured to the front surface of a flange portion 5 of the extruder body 1 by a fastening force releasable fastening means. The fastening force is added by a spring 15 and the fastening force is released by a jack 18. The fastening force urges the side guides 9 against the extruder body 1 so that no extruding material flows between the side guides 9 and the extruder body 1.

6 Claims, 3 Drawing Sheets

SHEET WIDTH ADJUSTING APPARATUS FOR ROLLING HEAD EXTRUDER

BACKGROUND OF THE INVENTION

The present invention relates to a sheet width adjusting apparatus for a roller head extruder for molding rubber, resin or the like into a sheet-like form.

In the past, a sheet width adjusting apparatus of this kind is disclosed in Japanese Utility Model Laid-Open No. 16223/1991 publication.

This apparatus comprises, as shown in FIG. 3, an extruder body 21, a pair of upper and lower calendar rolls 24 for molding a material into a sheet-like form mounted by a roll support bed 23 forwardly of a material extruding opening 22 of the body 21, and a pair of left and right side guides 25, 25 for determining a width of the material, whereby the side guides 25 are freely moved in a lateral direction by moving means 26 formed from a screw mechanism, and detachably secured to the extruder body 21 by means of fixing bolts 27.

When the sheet width is adjusted, the fixing bolts 27 are loosened, after which the side guides 25 are suitably and continuously moved in the lateral direction by the moving means 26, and the fixing bolts 27 are again fastened to secure the side guides to the extruder body 1. Reference numeral 28 denotes an extruding screw.

Although not shown, there is a sheet adjusting apparatus in which the side guides 25 are secured to the roll support bed 23 instead of the extruder body.

In the former (shown in FIG. 3) of the above-described prior art, it is necessary, in adjusting the sheet width, to loosen the fixing bolts 27 of the side guides 25. Thus, there poses a problem in that the width cannot be changed simply and automatically.

In the latter of the above-described prior art, the material extruded from a cylinder of the extruder body 21 by the screw 28 is moved in and between the side guides 25 and the extruder body 21 (a mating surface with the cylinder) by the pressure thereof. Therefore, the thus moved-in material constitutes a resistance to render the movement of the side guides 25 impossible. The moved-in material further constitutes a wedge so that the side guides 25 are inclined, thus posing a problem in that the side guides 25 and the calendar rolls 24 interfere each other.

SUMMARY OF THE INVENTION

It is an object of the present invention to provide a sheet width adjusting apparatus for a roller head extruder which can prevent a material from being moved in and between an extruder body and side guides and can automatically adjust a sheet width.

A preferred sheet width adjusting apparatus for a roller head extruder according to the present invention comprises an extruder body having a material charging opening into which material is charged and a material extruding opening from which material is extruded;

a pair of calendar rolls disposed forwardly of the material extruding opening of said extruder body, said calendar rolls molding the material extruded from the material extruding opening into a sheet form; and a pair of left and right side guides disposed between said material extruding opening and said calendar rolls for determining a width of the material to be supplied to said calendar rolls, said side guides being movable in the direction of the sheet width and being secured to the extruder body by fastening force releasable fastening means.

Further, the side guides may be moved by moving means such as a fluid pressure cylinder mechanism or a screw mechanism.

According to the sheet width adjusting apparatus for a roller head extruder according to the present invention, since the side guides are secured to the extruder body by fastening force releasable fastening means, even if the pressure of the extruding material exerts on the side guides, the extruding material is not moved in and between the extruder body and the contact surface of the side guides. Accordingly, the side guides are not inclined, and the side guides are not obstructed by the moved-in material for their movement. Further, the sheet width is not obstructed for its adjustment.

Further, in changing or adjusting the sheet width, the fastening force of the fastening means is released by the release means whereby the side guides can be moved in an axial direction of rollers simply and automatically. The sheet width can be adjusted automatically, continuously and positively. When the operation such as changing of the sheet width is completed, the fastening force release means is operated to exert the fastening force whereby the side guides are automatically secured to the extruder body.

PREFERRED EMBODIMENTS

The embodiment of the present invention will be described hereinafter with reference to the drawings.

Figure 1:
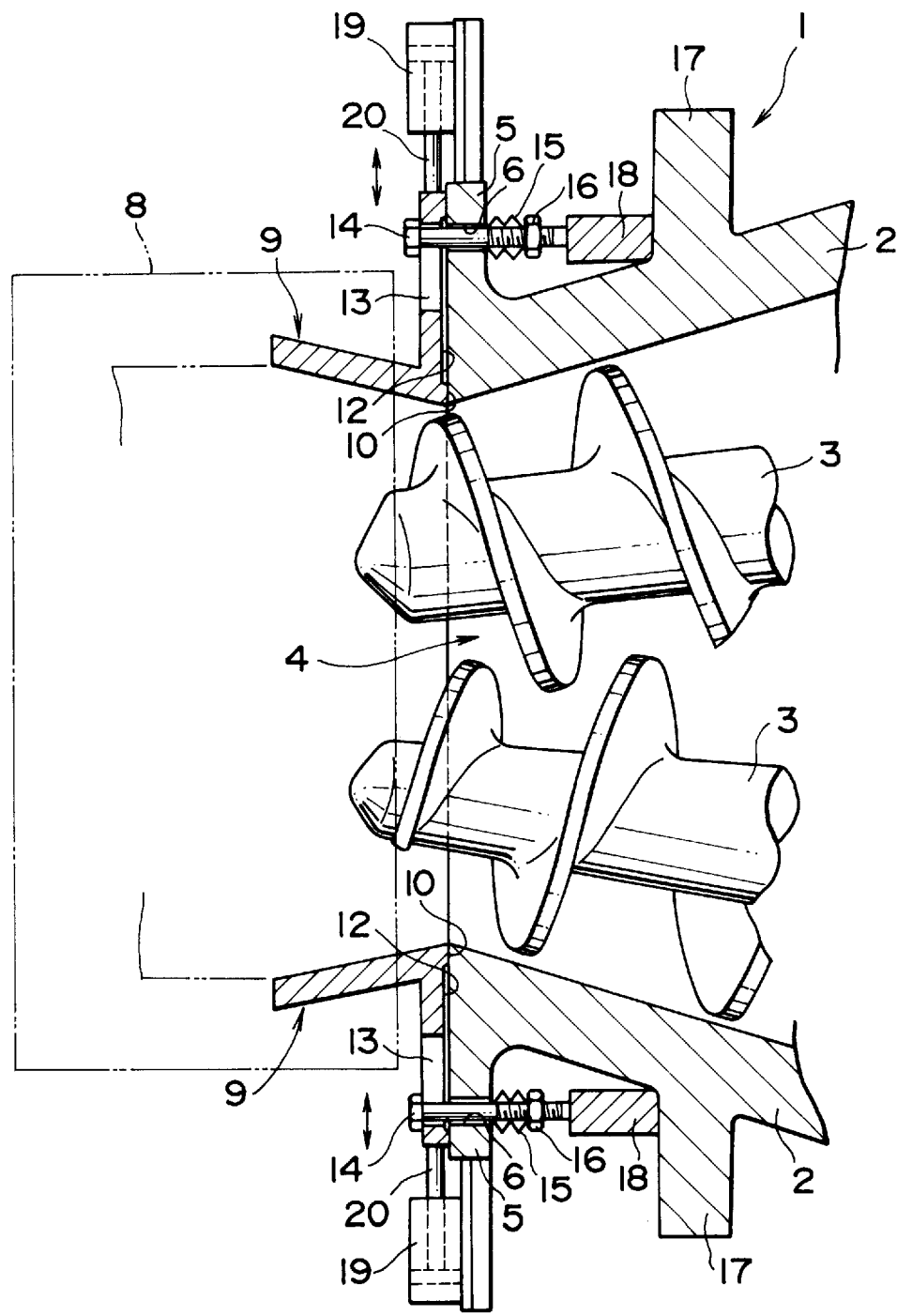
FIG. 1 is a cross-sectional plan view showing one embodiment of the present invention.
Figure 2:
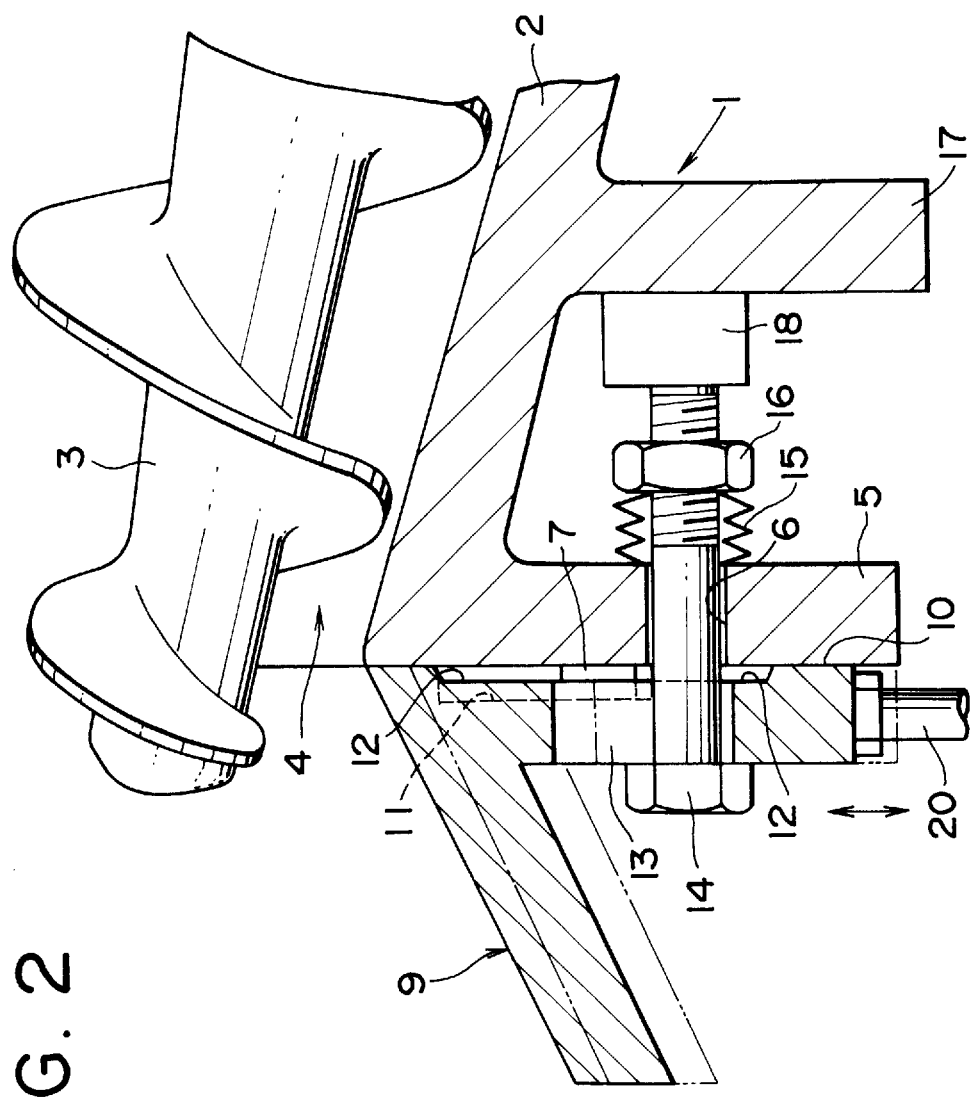
FIG. 2 is an enlarged view of essential parts of the above embodiment.
Figure 3:
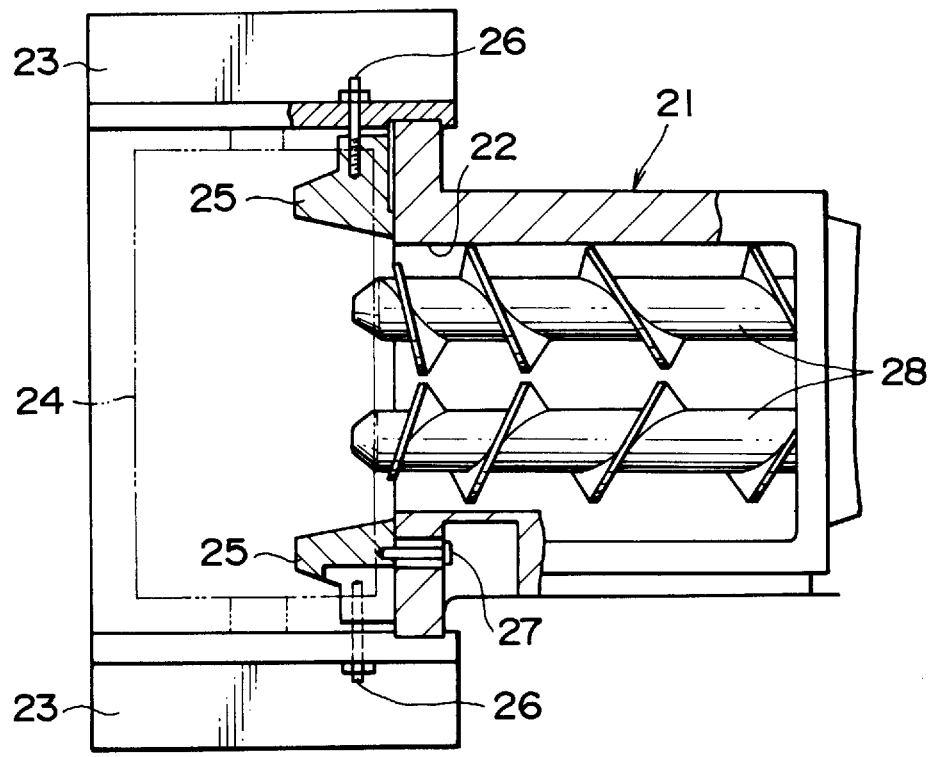
FIG. 3 is a cross-sectional plan view showing a conventional example.

FIGS. 1 and 2 show an embodiment of the present invention. Reference numeral 1 designates an extruder body. Two extruding screws 3, 3 are rotatably supported within a cylinder 2 of the extruder body. The cylinder 2 is provided with a material charging opening (not shown) and a material extruding opening 4, which is in turn formed with an outwardly directed outlet flange portion 5.

An outlet flange portion 5 is provided with guide mounting holes 6 positioned on both left and right sides, said guide mounting holes being extended through in a longitudinal direction. Slide keys 7 (or keyways) are provided in a laterally horizontal direction on both left and right sides on the front end surface, said slide keys 7 being on the same level.

In the vicinity forwardly of the extruding opening 4 are supported a pair of upper and lower opposed calendar rolls 8 horizontally and rotatably through a support bed not shown. The calendar rolls 8 cause the material from the extruding opening 4 to pass through between upper and lower portions thereof to be molded into a sheet having a desired thickness.

A pair of left and right side guides 9, 9 are disposed between the calendar rolls 8 and the extruding opening 4. The side guides 9 control the width of the material from the extruding opening 4 to determined a width dimension of a sheet formed by the calendar rolls 8. A contact surface of the body 1 relative to the front end of the flange 5 is formed with a keyway 11 and is provided with a depression portion 12 (a shallow depression for forming a non-contact surface), and a laterally long slot 13 is provided to be extended through in a longitudinal direction.

A slide key 7 provided in the outlet flange portion 5 of the body 1 is fitted in the keyway 11, and the side guides 9 are slidably moved in the lateral direction while maintaining its horizontal state.

A fixing bolt 14 is inserted forwardly into the slot 13. The bolt 14 is inserted into a mounting hole 6 provided in the flange portion 5 of the body 1, and a nut 16 is threadedly engaged with the bolt 14 through a fastening spring 15 (fastening force applying means). A fastening force releasing jack 18 is interposed between the extreme end of the fixing bolt 14 and a rib 17 of the body 1 to urge the fixing bolt 14 toward the head against the fastening force of the spring 15 so as to release the fastening by the fixing bolt 14. Once the fastening force releasing jack 18 has applied sufficient force to overcome the spring force of the fastening spring 15, the contact force between the head of the fixing belt 14 and the associated contact surface of the side guide 9 is decreased, thus unfastening the assembly. The decreased contact force between the head of the fixing belt 14 and the side guide 9 allows the side guide 9 to move relative to the fixing bolt 14.

Hydraulic cylinders 19 which are side guide moving means are provided opposedly to left and right on both left and right outer ends of the flange portion 5. An outer end of a piston rod 20 of the cylinder 19 is connected to the side guide 9. It is noted that the side guide moving means may employ a screw mechanism so that it may be automatically moved electrically. Further, the side guide moving means can be mounted on the support bed of the calendar rolls 8.

In the above-described embodiment, since the side guide 9 is secured to the flange portion 5 of the extruder body 1 by fastening means comprising a bolt 14, a nut 16, a fastening spring 15 and a jack 18, even if the pressure of the extruding material exerts on the side guides 9, there produces no clearance between the contact surface 10 of the side guide 9 and the contact surface of the front end of the flange portion 5. Therefore, the extruding material is not moved in, and the side guides 9 are not inclined and obstructed for their movement.

Further, in the present embodiment, a depression or a non-contact portion is provided on the contact surface side of the side guides with respect to the extruder body whereby the contact area is as minimum as required and the fastening force per unit area exerting on the contact surface increases to prevent the extruding material from being moved in and between contact surfaces between the side guides and the extruder body.

Now, in changing or adjusting the sheet width, the jack 18 is activated to press and move the fixing bolt 14 toward the head (forwardly) against the fastening force of the fastening spring 15 whereby the fastening force is automatically released. Then, the hydraulic cylinders 19 can be activated to automatically and continuously move the side guides 9 in the lateral direction (in the axial direction of the roller) while being guided by the slide key 7.

When the operation of changing the sheet width or the like is completed in a manner as described above, the jack 18 is operated to release the press- and moving force of the fixing bolts 14 whereby the fastening force caused by the fastening spring 15 exerts so that the side guides 9 are automatically fastened and secured to the front end of the body flange portion 5.

Preferably, the side guide 9 is interiorly formed with a jack to which cooling liquid is supplied. When the material extruded is a high polymeric material, particularly, rubber, it adheres to the surface of the side guides 9 depending on the kind of materials which form the side guides, and the rubber sometimes remains. Accordingly, when cooling water or the like is supplied to the jack formed interiorly of the side guides 9 to cool the former, even if the surface of the side guide comes in contact with the material, the material is not adhered.

Further, preferably, the side guides 9 are applied on the surface in contact with the material with plating such as hard chrome plating. When the plating is applied as described, the wear resistance increases, and the surface is smooth. The adhesion of material materially decreases.

The present invention is not limited to the above-described embodiment but as the side guide moving means, a fluid pressure cylinder such as oil pressure or a fluid pressure cylinder having a spring back mechanism added thereto may be employed. The design may be changed suitably.

What is claimed is:

1. A roller head extruder comprising:

an extruder body having a material charging opening into which material is charged and a material extruding opening from which material is extruded;

a pair of calendar rolls disposed forwardly of the material extruding opening of said extruder body, said calendar rolls molding the material extruded from the material extruding opening into a sheet form;

a pair of left and right side guides disposed between said material extruding opening and said calendar rolls for determining a width of the material to be supplied to said calendar rolls; and fastening force releasable means for resiliently holding said side guides against the extruder body and for selectively releasing said side guides.

2. A roller head extruder according to claim 1, further comprising moving means such as a fluid pressure cylinder mechanism or a screw mechanism for moving said side guides.

3. A roller head extruder according to claim 1, wherein said fastening means comprises a bolt and nut, a fastening spring slipped over the bolt, and a jack, the fastening force of the spring being released by the jack.

4. A roller head extruder according to claim 3, further comprising moving means such as a fluid pressure cylinder.

5. A roller head extruder according to claim 4, wherein said fluid pressure cylinder has a spring back mechanism added thereto.

6. A roller head extruder according to claim 1, wherein a depression is provided on the surface of said side guide in contact with the extruder body.

* * * * *